(12) United States Patent
Kim et al.

(10) Patent No.: US 12,731,371 B2
(45) Date of Patent: Sep. 8, 2026

(54) APPARATUS AND METHOD FOR CONTROLLING A FEED SUPPLY AMOUNT BASED ON FEED INTAKE INTENTION OF LIVESTOCK

(71) Applicant: ELECTRONICS AND TELECOMMUNICATIONS RESEARCH INSTITUTE, Daejeon (KR)

(72) Inventors: You Jin Kim, Daejeon (KR); Se Han Kim, Daejeon (KR); Dae Heon Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 401 days.

(21) Appl. No.: 18/237,703

(22) Filed: Aug. 24, 2023

(65) Prior Publication Data

US 2024/0156052 A1 May 16, 2024

(30) Foreign Application Priority Data

Nov. 16, 2022 (KR) ........................ 10-2022-0153800

(51) Int. Cl.
*G06V 10/60* (2022.01)
*A01K 5/02* (2006.01)
(Continued)

(52) U.S. Cl.
CPC ............ *G06V 10/60* (2022.01); *A01K 5/0275* (2013.01); *A01K 29/005* (2013.01);
(Continued)

(58) Field of Classification Search
CPC ...... G06V 10/60; G06V 10/772; G06V 20/52; G06V 40/10; G06V 10/50; A01K 5/0275;
(Continued)

(56) References Cited

U.S. PATENT DOCUMENTS

2012/0135383 A1 5/2012 Jang et al.
2015/0342143 A1* 12/2015 Stewart ................ A01K 5/0283 119/51.02
(Continued)

FOREIGN PATENT DOCUMENTS

CN 2867858 Y 2/2007
KR 10-2005-0111038 A 11/2005
(Continued)

OTHER PUBLICATIONS

Design a system for measuring individual cow feed intake in commercial dairies (Year: 2021).*

*Primary Examiner* — Jennifer Mehmood
*Assistant Examiner* — Pardis Sohraby
(74) *Attorney, Agent, or Firm* — LRK PATENT LAW FIRM

(57) ABSTRACT

Provided are an apparatus and method for controlling a feed supply amount based on feed intake intention of livestock. The apparatus for controlling a feed supply amount based on feed intake intention of livestock includes a feed intake intention quantification part which perceives feed intake intention of livestock by using image information obtained by photographing a certain region within a livestock farm and quantifies the feed intake intention of livestock as a feed intake intention value, and a feed intake intention-based feed
(Continued)

supply amount control part generating a command for controlling a feed supply amount in consideration of the feed intake intention value.

19 Claims, 12 Drawing Sheets

(51) Int. Cl.
*A01K 29/00* (2006.01)
*G06V 10/772* (2022.01)
*G06V 20/52* (2022.01)
*G06V 40/10* (2022.01)

(52) U.S. Cl.
CPC ............ *G06V 10/772* (2022.01); *G06V 20/52* (2022.01); *G06V 40/10* (2022.01)

(58) Field of Classification Search
CPC ...... A01K 29/005; A01K 5/02; A01K 5/0283; G01J 1/02; G06T 3/40
USPC .......................................................... 382/110
See application file for complete search history.

(56) References Cited

U.S. PATENT DOCUMENTS

| | | | |
|---|---|---|---|
| 2016/0050888 A1 | 2/2016 | Berckmans et al. | |
| 2016/0205894 A1 | 7/2016 | Kim et al. | |
| 2021/0007330 A1 | 1/2021 | Huisma et al. | |
| 2021/0360901 A1 * | 11/2021 | Blokland | A01K 5/00 |

FOREIGN PATENT DOCUMENTS

| | | | |
|---|---|---|---|
| KR | 10-1154552 B1 | 6/2012 | |
| KR | 10-1170339 B1 | 8/2012 | |
| KR | 10-1290555 B1 | 8/2013 | |
| KR | 10-1348964 B1 | 1/2014 | |
| KR | 10-1521502 B1 | 5/2015 | |
| KR | 101618145 B1 * | 5/2016 | |
| KR | 10-1753660 B1 | 7/2017 | |
| KR | 10-2021-0066710 A | 6/2021 | |
| KR | 10-2022-0039373 A | 3/2022 | |
| KR | 10-2022-0068711 A | 5/2022 | |
| KR | 10-2022-0089272 A | 6/2022 | |
| WO | WO-2021172574 A1 * | 9/2021 | A01K 29/005 |

* cited by examiner

FIG. 1

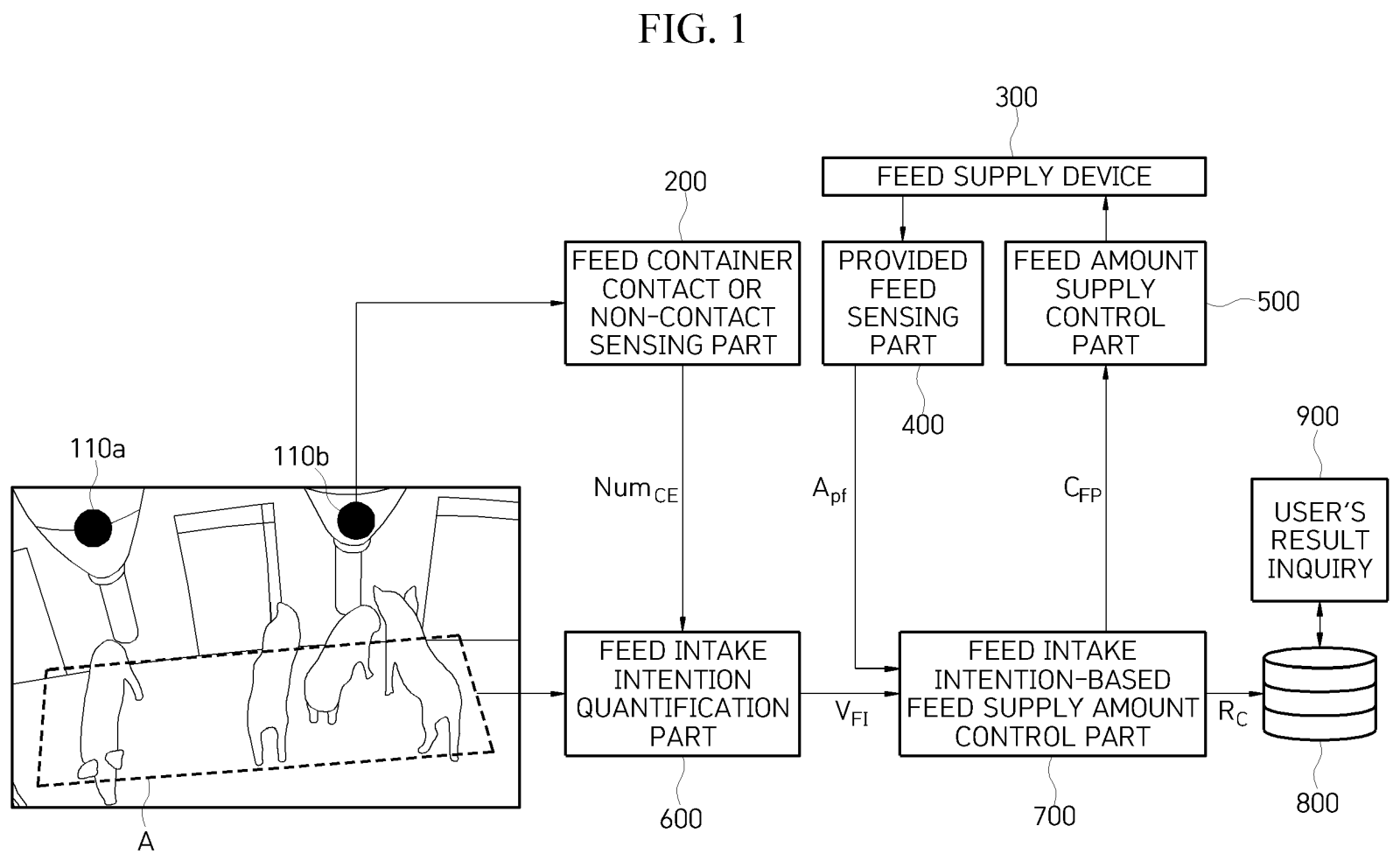

FEED CONTAINER CONTACT OR NON-CONTACT SENSING PART
200
FEED SUPPLY DEVICE
300
PROVIDED FEED SENSING PART
400
FEED AMOUNT SUPPLY CONTROL PART
500
FEED INTAKE INTENTION QUANTIFICATION PART
600
FEED INTAKE INTENTION-BASED FEED SUPPLY AMOUNT CONTROL PART
700
800
USER'S RESULT INQUIRY
900
$Num_{CE}$
$A_{pf}$
$V_{FI}$
$C_{FP}$
$R_C$
110a
110b
A

Figure 4:
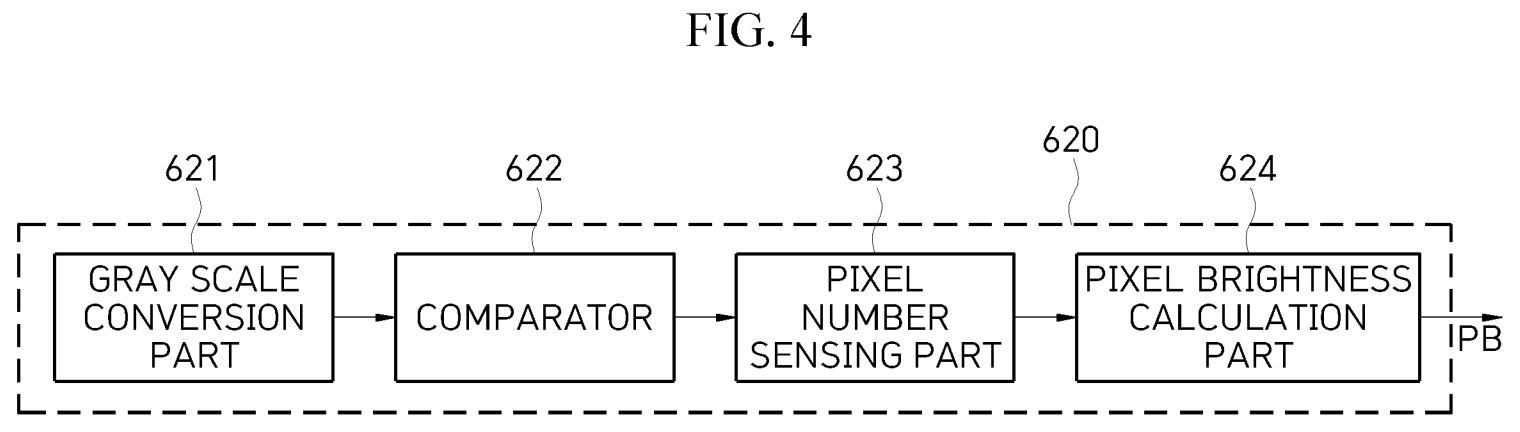

621 GRAY SCALE CONVERSION PART

622 COMPARATOR

623 PIXEL NUMBER SENSING PART

624 PIXEL BRIGHTNESS CALCULATION PART

IPB

APPARATUS AND METHOD FOR CONTROLLING A FEED SUPPLY AMOUNT BASED ON FEED INTAKE INTENTION OF LIVESTOCK

CROSS-REFERENCE TO RELATED APPLICATION

This application claims priority to and the benefit of Korean Patent Application No. 10-2022-0153800, Nov. 16, 2022, the disclosure of which is incorporated herein by reference in its entirety.

BACKGROUND

1. Technical Field

[1] The present disclosure relates to an apparatus and method for controlling a feed supply amount based on feed intake intention of livestock.

2. Description of Related Art

[2] According to the related art, feed is unilaterally supplied according to a feed supply amount which has been set depending on the experience of a pig farm manager, and so there is a problem in that the supply amount cannot be adjusted in consideration of the pig's health condition and feed intake intention.

[3] As for technologies of obtaining image information and analyzing the image information using artificial intelligence technology to monitor pig behavior, there are limitations in that it takes a lot of money to prepare a dataset for learning, and high-performance computing resources for learning and inference are required, which in turn makes it difficult to employ these technologies in the field of feed supply amount control.

SUMMARY

[4] The present disclosure has been proposed to address the above-described problems, and its object is to provide an apparatus and method which are capable of efficiently managing pig growth, without using expensive computing resources, by quantifying and determining the pig's feed intake intention through a pixel information analysis of an image, and by controlling a feed supply amount based on the livestock's feed intake intention.

[5] The present disclosure relates to an apparatus and method for controlling a feed supply amount based on feed intake intention of livestock.

[6] The apparatus for controlling a feed supply amount based on feed intake intention of livestock according to the present disclosure includes a feed intake intention quantification part which perceives feed intake intention of livestock by using image information obtained by photographing a certain region within a livestock farm and quantifies the feed intake intention of livestock as a feed intake intention value, and a feed intake intention-based feed supply amount control part generating a command for controlling a feed supply amount in consideration of the feed intake intention value.

[7] The feed intake intention quantification part includes a timestamp generating part configured to receive feed container contact event occurrence information and output a timestamp value for an event occurrence time, a pixel brightness amount sensing part in a virtual zone configured to analyze a pixel information in a virtual feed intake action zone and output a pixel brightness amount information, a dictionary generating part configured to configure dictionary data using the timestamp value and the pixel brightness amount information, a pixel brightness value averaging part configured to output a pixel brightness average value using the dictionary data, and a feed intake intention quantification module configured to output a feed intake intention quantification value using the pixel brightness average value.

[8] The timestamp generating part receives the feed container contact event occurrence information generated according to the result of perceiving the lighting brightness that is turned on or off depending on whether the livestock approaching the virtual feed intake action zone is in contact with the feed container.

[9] The pixel brightness amount sensing part in a virtual zone selects pixels having brightness higher than a predetermined pixel brightness threshold, and outputs a pixel brightness amount in the virtual zone.

The pixel brightness amount sensing part in a virtual zone converts the image information into a gray scale, and calculates the number of pixels having a brightness higher than the predetermined pixel brightness threshold compared to the total number of pixels in the virtual feed intake action zone, and outputs the pixel brightness amount in the virtual zone.

The dictionary generating part configures the dictionary data according to time order by inputting the timestamp value to Key and inputting the pixel brightness amount information to Value.

The pixel brightness value averaging part outputs the pixel brightness average value at a predefined time interval.

The feed intake intention quantification module outputs the feed intake intention quantification value by using a predefined quantification weight.

When it is determined that the feed intake intention is high in consideration of the feed intake intention, the feed intake intention-based feed supply amount control part provides feed at a predefined number of times and updates the number of times of provision for a daily appropriate supply feed amount.

When it is determined that the feed intake intention is appropriate in consideration of the feed intake intention, the feed intake intention-based feed supply amount control part provides feed at a predefined one time and updates the number of times of provision for a daily appropriate supply feed amount.

When it is determined that the feed intake intention is low in consideration of the feed intake intention, the feed intake intention-based feed supply amount control part interrupts feed supply and maintains the number of times of provision for a daily appropriate supply feed amount, and transmits an abnormal notification to a farm manager.

The method for controlling a feed supply amount based on feed intake intention of livestock according to the present disclosure includes (a) obtaining information about whether livestock is in contact with a feed container, (b) determining the feed intake intention of the livestock through pixel information analysis in an image, and (c) controlling a feed supply amount based on the information obtained in step (a) and the feed intake intention obtained in step (b).

The step (a) includes receiving feed container contact event occurrence information generated according to the result of perceiving the lighting brightness that is turned on or off depending on whether the livestock approaching a virtual feed intake action zone is in contact with the feed container.

The step (a) includes recording a timestamp value for the occurrence time of the feed container contact event occurrence information.

The step (b) includes analyzing pixel information in a virtual feed intake action zone to output pixel brightness amount information by selecting pixels having a brightness higher than a predefined pixel brightness threshold and outputting a pixel brightness amount in a virtual zone.

The step (c) includes performing at least one of determining whether to supply feed, determining to supply feed at a predetermined number of times, and determining to update a number of times of provision for a daily appropriate supply feed amount, in consideration of the feed intake intention.

The apparatus for controlling a feed supply amount based on feed intake intention of livestock according to the present disclosure includes an input part configured to obtain image photographing information for a preset virtual zone near a feed container, a memory configured to store a program for determining feed intake intention by using the image photographing information, and a processor configured to execute the program, wherein the processor performs at least one of determining whether to supply feed, determining to supply feed at a predetermined number of times, and determining to update a number of times of provision for a daily appropriate supply feed amount, based on the feed intake intention.

The processor generates dictionary data by using a timestamp value for a feed container contact event occurrence time and a pixel brightness amount information obtained by analyzing the image photographing information for the virtual zone, and outputs a pixel brightness average value by using the dictionary data, and calculates a quantified feed intake intention value in consideration of the pixel brightness average value.

The processor generates the pixel brightness amount information by using a number of pixels brighter than a predefined threshold compared to a total number of pixels in the virtual zone, and outputs the pixel brightness average value by using predefined time interval information.

The present disclosure provides the following advantageous effect: it can be practicalized to be utilized in farms only with low-cost computing resources by simply using only pixel brightness in the image analysis process to quantify the pig's feed intake intention.

According to the present disclosure, it is possible to efficiently manage the growth of pigs by controlling the feed supply amount based on the feed intake intention.

The advantageous effects of the present disclosure are not limited to the aforementioned ones, but other unmentioned advantageous effects thereof will become apparent to those skilled in the art from the description below.

BRIEF DESCRIPTION OF THE DRAWINGS

FIG. 1 shows an apparatus for controlling a feed supply amount based on feed intake intention of livestock according to an embodiment of the present disclosure.

FIG. 4 shows a process of sensing a pixel brightness amount in a virtual zone according to an embodiment of the present disclosure.

DETAILED DESCRIPTION

Figure 2:
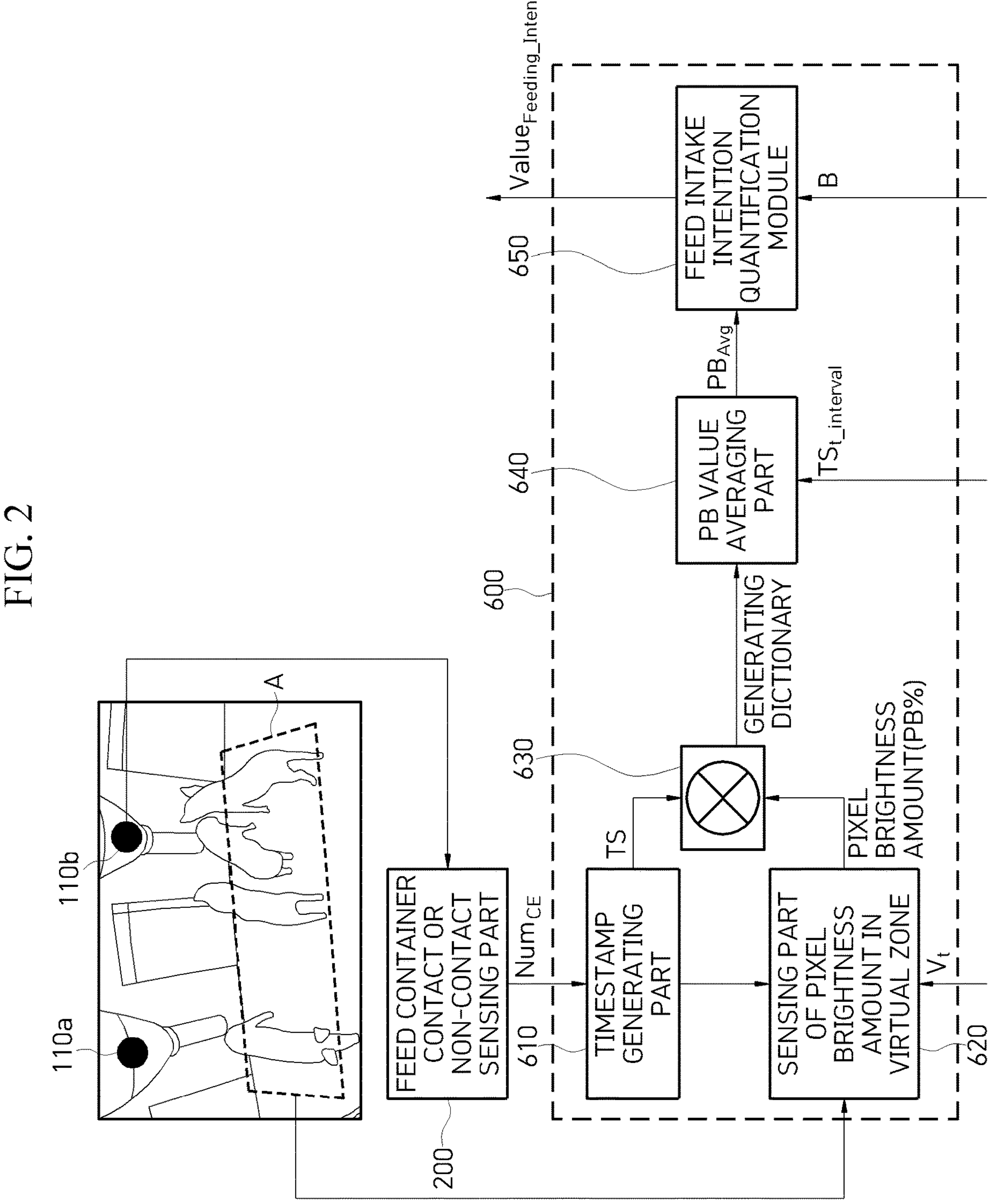
FIG. 2 shows a process of quantifying feed intake intention according to an embodiment of the present disclosure.

The above-described and other objects, advantages and features of the present disclosure, and methods of achieving them will become apparent when the embodiments described below in detail are considered in conjunction with the accompanying drawings.

However, the present disclosure is not limited to the embodiments disclosed below, but will be implemented in a variety of different forms, and the present embodiments are only provided to easily inform those of ordinary skill in the art to which the present disclosure belongs, of purposes, configuration and effects of the disclosure, and the scope of right of the present disclosure is defined by the description of the claims.

Meanwhile, as used herein, the terms are for the purpose of describing the embodiments, and are not intended to limit the present disclosure. Herein, terms in the singular form also relate to the plural form unless specifically stated otherwise in the context. As used herein, the terms "comprises" and/or "comprising" specify the presence of stated components, steps, operations, and/or elements, but do not preclude the presence or addition of at least one other component, step, operation, and/or element.

According to the related art, in a pig farm, feed contained in a feed container and selected by a farm manager is automatically or manually supplied, and the amount of feed to be supplied to pigs per day is determined according to a set supply amount which has been set by the farm manager. When the control is performed N times a day in relation to supplying feed, a certain amount of feed is unilaterally supplied to pigs according to a predetermined number of times.

The pigs must consume feed according to the rules and methods unilaterally determined by the farm manager, and they may consume all or only a portion of the provided feed depending on their health and growth conditions. In the latter case, it is problematic that the uneaten feed remaining on the lower portion of the feed container is easily corrupted in a high-temperature and high-humidity environment in the pigpen.

There is a strong trend that healthy pigs have high feed intake intention and high amount of action whereas unhealthy pigs have low amount of action and low feed intake intention. According to the related art, the feed is unilaterally supplied by the farm manager, and the health status of pigs is inferred with the reliance on the experience of the farm manager, so that the accuracy and efficiency of the inference is problematically low.

As described above, according to the related art, since the feed is provided to pigs unilaterally by the farm manager, there is a problem in that the feed intake intention of pigs is not grasped and feed management and pig growth environment management are not efficient.

In addition, obtaining image information and monitoring pig behavior using artificial intelligence technologies such as deep learning or the like requires a high-performance computer for preparing and learning datasets for learning, and high-performance computing resources for inference after completing a deep learning model, which in turn leads to high costs, rendering it an unrealistic solution.

The present disclosure has been proposed to address the above-described problems, and presents an apparatus and method for controlling a feed supply amount, which are capable of supplying feed based on the feed intake intention of a plurality of pigs when the pigs approach an automatic feed feeder (feed container) and do an action of feed intake in the pigpen of a barn.

According to the present disclosure, it is possible to efficiently manage pig growth, without using expensive computing resources, by quantifying and determining the pig's feed intake intention through a pixel information analysis of an image, and by controlling a feed supply amount based on the feed intake intention.

According to an embodiment of the present disclosure, in an image obtained using an image camera, a certain region near a feed container is set as a virtual zone (zone for feed container access), and when an event in which a pig contacts the feed container for feed intake occurs, the feed intake intention is determined by analyzing the amount of pixels by which bright pixels increase in a dark closed pigpen (i.e., sensing information related to the density of pigs in the virtual zone using the pixel brightness amount).

According to an embodiment of the present disclosure, by determining and quantifying the feed intake intention of a pig using computing resources that are much lighter than computing resources for artificial intelligence such as deep learning or the like, and by controlling the feed supply amount in consideration of the sensing information about the feed amount provided to the pigpen and the feed intake intention, the pig's growth environment is efficiently managed.

According to an embodiment of the present disclosure, in the case of breeding pigs in a closed room in a pigpen, pig room in a pig farm, through the installation of an image camera, it is possible to monitor the condition of pigs and promote efficient management of pig farms.

FIG. 1 shows an apparatus for controlling a feed supply amount based on feed intake intention of livestock according to an embodiment of the present disclosure.

The apparatus for controlling a feed supply amount based on feed intake intention of livestock according to an embodiment of the present disclosure includes a feed intake intention quantification part 600, a feed intake intention-based feed supply amount control part 700, and a recording part 800 for recording the pig's feed intake intention and the actual feed supply amount.

A feed container contact or non-contact sensing part 200, a feed supply device 300, a supplied feed sensing part 400, and a feed amount supply control part 500 shown in FIG. 1 transmit and receive data with the apparatus for controlling a feed supply amount based on feed intake intention according to an embodiment of the present disclosure, and enable a feed supply amount control operation.

The feed container contact or non-contact sensing part 200 according to an embodiment of the present disclosure senses whether a pig contacts the feed container by using operation state information of an off-state lighting 110*a* and the on-state lighting 110*b*. At this time, the operation state information of the off-state lighting 110*a* and the on-state lighting 110*b* is obtained using an image camera 1000 (see FIGS. 6A and 6B).

The feed container contact or non-contact sensing part 200 generates an event as a result of the feed container contact or non-contact sensing, and transmits the number of event occurrences ($Num_{CE}$, Num of Contact Event) to the feed intake intention quantification part 600.

The feed intake intention quantification part 600 according to an embodiment of the present disclosure recognizes a preset virtual feed intake action zone A centered around the feed container from the image obtained through the image camera 1000.

As the image of the virtual zone is obtained, sensing information about whether a pig exists in the virtual feed intake action zone A is transmitted to the feed intake intention quantification part 600.

A process of quantifying feed intake intention will be described later with reference to FIGS. 2 and 3, and the feed intake intention quantification part 600 transmits the pig's feed intake intention value ($V_{FI}$, Value of Feeding Intent) to the feed intake intention-based feed supply amount control part 700.

The feed intake intention-based feed supply amount control part 700 performs the feed supply amount control based on the quantified feed intake intention value $V_{FI}$ of the pig and the feed amount provided to the pigpen ($A_{pf}$, Amount of provided feeding) received from a provided feed sensing part 400. The control process of the feed intake intention-based feed supply amount control part 700 will be described later in detail with reference to FIG. 5.

The control command ($C_{FP}$, Control of Feeding Provider) outputted as a result of performing the control of the feed intake intention-based feed supply amount control part 700 is transmitted to the feed amount supply control part 500, and the feed amount supply control part 500 controls the feed supply device 300 in the pigpen through a control command.

The provided feed sensing part 400 senses the feed amount provided to the pigpen using a sensing means, and transmits the result ($A_{pf}$) to the feed intake intention-based feed supply amount control part 700.

The result of performing the control ($R_C$, Result of Control) by the feed intake intention-based feed supply amount control part 700 is stored in the recording part 800, and the recording part 800 performs time-specific records of the pig's feed intake intention and the actually provided feed supply amount for comparison thereof.

Through the user's result inquiry 900, it is possible to inquire about the recorded results.

FIG. 2 shows a process of quantifying feed intake intention according to an embodiment of the present disclosure.

The feed intake intention quantification part 600 includes a timestamp generating part 610, a pixel brightness amount sensing part in a virtual zone 620, a dictionary generating part 630, a PB value averaging part 640, and a feed intake intention quantification module 650.

The image information including the virtual feed intake action zone A is transmitted to the pixel brightness amount sensing part in a virtual zone 620, and the pixel brightness amount sensing part in a virtual zone 620 receives a predefined pixel brightness threshold $V_t$, selects pixels having brightness higher than the threshold, and outputs a pixel brightness amount (PB %) in the virtual zone. The pixel brightness amount (PB %) in the virtual zone is inputted to the dictionary generating part 630.

The number of event occurrences ($Num_{CE}$, Num of Contact Event) outputted by the feed container contact or non-contact sensing part 200 is delivered to the timestamp generating part 610. The timestamp generating part 610 outputs a timestamp value (TS, Timestamp) of the occurrence time of an event that occurred when the pig contacted the feed container. The timestamp value (TS, Timestamp) is inputted to the dictionary generating part 630.

The dictionary generating part 630 configures the pixel brightness amount (PB %) in the virtual zone and the timestamp value (TS) as data in the form of {Key:Value}. TS is inputted to the Key, and PB % is inputted to the Value, and over time, the dictionary is generated in the form of $\{TS_{t1}: PB_1, TS_{t2}: PB_2, TS_{t3}: PB_3, \ldots TS_{tN}: PB_N\}$.

The PB value averaging part 640 receives the dictionary data from the dictionary generating part 630, and receives a setting information ($TS_{t\_interval}$) at predetermined unit time intervals. The PB value averaging part 640 performs PB value averaging as shown in [Equation 1] below.

$$\text{Int\_Num}=\text{Min}(\text{Avg}((TS_{tN}-TS_{t1*})/TS_{t\_interval}))$$

$$PB_{Avg}=\Sigma(PB_N-PB_{1*})/\text{Int\_Num} \quad \text{[Equation 1]}$$

In [Equation 1], $TS_{t1*}$ denotes the start timestamp time of an arbitrary starting point, and $PB_{1*}$ denotes the pixel brightness value at the timestamp of an arbitrary starting point.

The PB value averaging part 640 delivers PB value average information $PB_{AVG}$ for a predefined time interval to the feed intake intention quantification module 650. The feed intake intention quantification module 650 receives a predefined quantification weight B, and outputs a quantification value ($V_{FI}$, $V_{Feeding\_Intent}$) calculated according to [Equation 2].

$$V_{FI}=B*PB_{Avg} \quad \text{[Equation 2]}$$

The feed intake intention is defined as shown in [Table 1] below.

TABLE 1

| | |
|---|---|
| MAX | Feed intake intention maximum value |
| MID | Feed intake intention balance value |
| MIB | Feed intake intention minimum value |
| MID < $V_{FI}$ < MAX | The feed intake intention is high. |
| $V_{FI}$ ≈ MID | The feed intake intention is appropriate. |
| MIN < $V_{FI}$ <MID | The feed intake intention is low. |

Figure 3A:
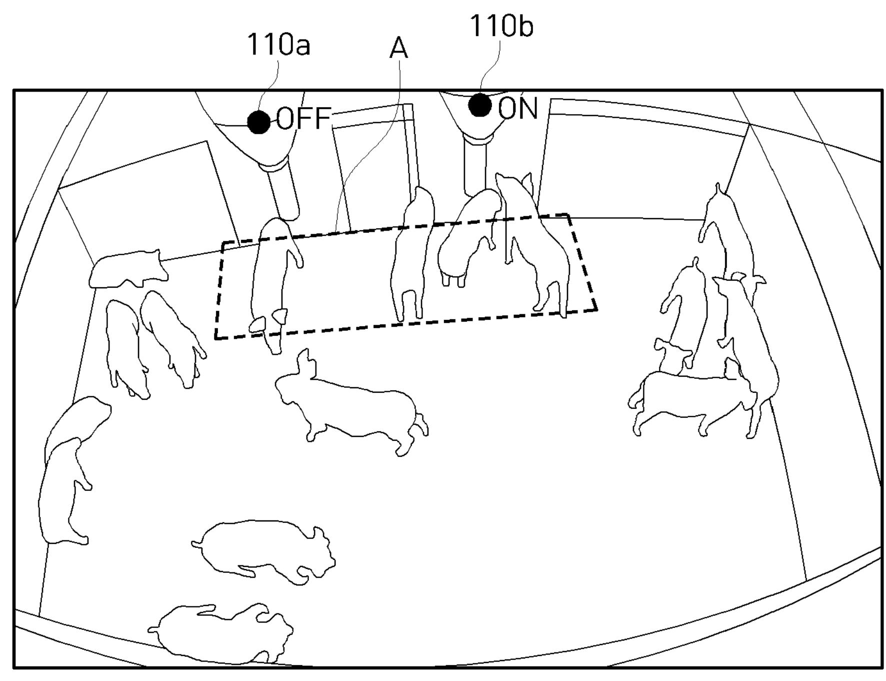
FIGS. 3A to 3C show image photographs according to an embodiment of the present disclosure.
Figure 3B:
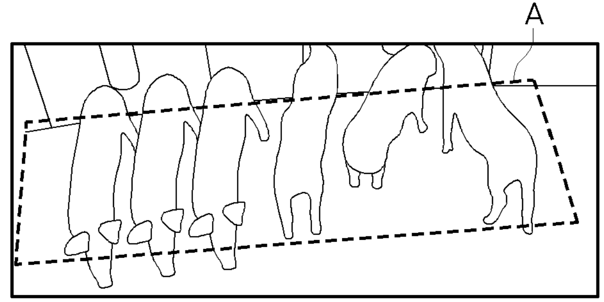
Figure 3C:
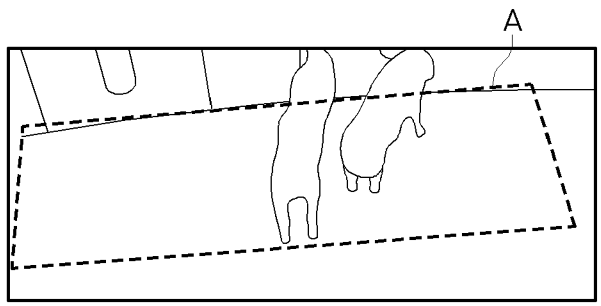

FIGS. 3A to 3C show image photographs according to an embodiment of the present disclosure, and FIG. 4 shows a process of sensing a pixel brightness amount in a virtual zone according to an embodiment of the present disclosure.

Referring to FIG. 3A, a photographic image of a pigpen including a virtual feed intake action zone A is obtained.

Referring to FIG. 3B, a case in which there are relatively many bright pixels in the virtual feed intake action zone A is shown, and referring to FIG. 3C, a case in which there are relatively few bright pixels in the virtual feed intake action zone A is shown.

Referring to FIG. 4, a gray scale conversion part 621 converts the image of the virtual zone into gray scale and transmits it to the comparator 622. The comparator 622 senses only pixels brighter than a predefined pixel brightness threshold value Vt by using [Equation 3].

Number of bright pixels=(Input_Gray>Pixel brightness threshold value *Vt* predefined by a user) [Equation 3]

The comparator 622 outputs pixels brighter than the threshold value, and a pixel number sensing part 623 senses the number of bright pixels compared to the total number of pixels in the virtual feed intake action zone A.

The pixel brightness calculation part 624 outputs the pixel brightness (PB %) in the virtual zone as shown in [Equation 4] by using information on the number of bright pixels compared to the total number of pixels in the virtual feed intake action zone A. For example, the output of the PB amount may be 90% in the case of FIG. 3B, and 20% in the case of FIG. 3C.

(Number of bright pixels/total number of pixels in virtual zone)*100=Pixel Brightness amount in a virtual zone (*PB* %) [Equation 4]

Figure 5:
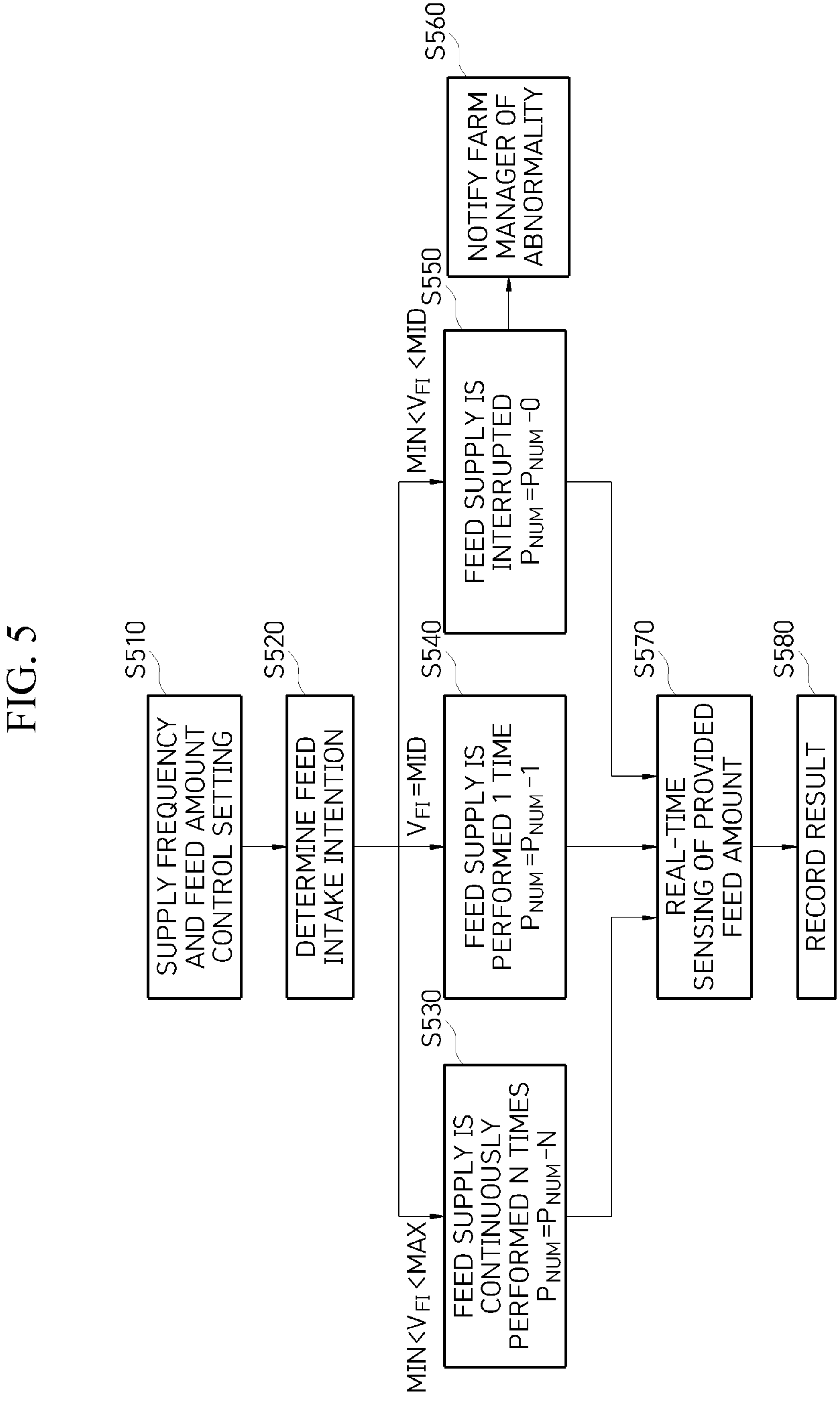
FIG. 5 shows a process for controlling a feed supply amount based on feed intake intention of livestock according to an embodiment of the present disclosure.

FIG. 5 shows a process for controlling a feed supply amount based on feed intake intention of livestock according to an embodiment of the present disclosure.

In step S510, the supply frequency and feed amount control setting is performed.

In step S510, a farm manager performs control settings for the number of supply times and the feed amount per one time in consideration of the daily appropriate supply feed amount according to the ages of the pigs and the number of breeding heads.

In step S520, the feed intake intention ($V_{FI}$) of the pigs is determined, and depending on the result, one of 3 branched steps S530, S540 and S550 is selected. Hereinafter, $P_{NUM}$ (Providing Number) is defined as the number of provisions for the daily appropriate supply feed amount.

In step S520, if MID<$V_{FI}$<MAX, that is, if it is determined that the feed intake intention is high, step S530 is performed. In step S530, the feed supply is continuously performed N times defined by the user, and the number of times of $P_{NUM}$ is updated as $P_{NUM}=P_{NUM}-N$.

In step S520, if $V_{FI}$≈MID, that is, if it is determined that the feed intake intention is appropriate, step S540 is performed. In step S540, the feed supply is continuously performed 1 time, and the number of times of $P_{NUM}$ is updated as $P_{NUM}=P_{NUM}-1$.

In step S520, if MIN<$V_{FI}$<MID, that is, if it is determined that the feed intake intention is low, step S550 is performed. In step S550, the feed supply is interrupted, and the number of times of $P_{NUM}$ is maintained as $P_{NUM}=P_{NUM}-0$. Subsequently, in step S560, an abnormality notification is transmitted to the farm manager.

After the control for the feed supply has been performed according to step S530, S540 or S550, real-time sensing is performed for the supplied feed amount in step S570. The foregoing process is repeated, and in step S580, when the provision for the daily appropriate supply feed amount is completed, the pig's feed intake intention is compared with the actually provided feed supply information, and the result is recorded for each time period.

FIGS. 6 and 7 show the operation of a feed feeder contact notification lighting according to an embodiment of the present disclosure.

A lighting device 100 according to an embodiment of the present disclosure is configured to be turned off (110*a*) or on (110*b*) depending on whether a pig contacts a feed feeder (feed container), regardless of whether the feed feeder (feed container) is old or new. Whether the lighting is turned on/off is sensed by the image camera 1000.

The new feed feeder provides a means such as wired and wireless communication, and when the communication between an additional device arbitrarily installed by the user and the feed container is possible, it provides a state in which it is possible to know whether a pig is in contact with the feed container. The old feed feeder does not provide a means of communication, and refers to a feed feeder in which it is unknown whether a pig is in contact with the feed container.

When the lighting device 100 according to an embodiment of the present disclosure is additionally mounted on the feed container, it is possible to know whether a pig contacts the feed container through the image camera regardless of the presence or absence of the communication function, or the interworking of the communication function.

The lighting device 100 according to an embodiment of the present disclosure includes a power supply part 120, a fixing part 130 for fixing the lighting device to a feed feeder (feed container), and a lighting control mechanism 140. Additionally, it includes a hall effect sensor 150 using a magnet to determine whether a pig is in contact.

Figure 6A:
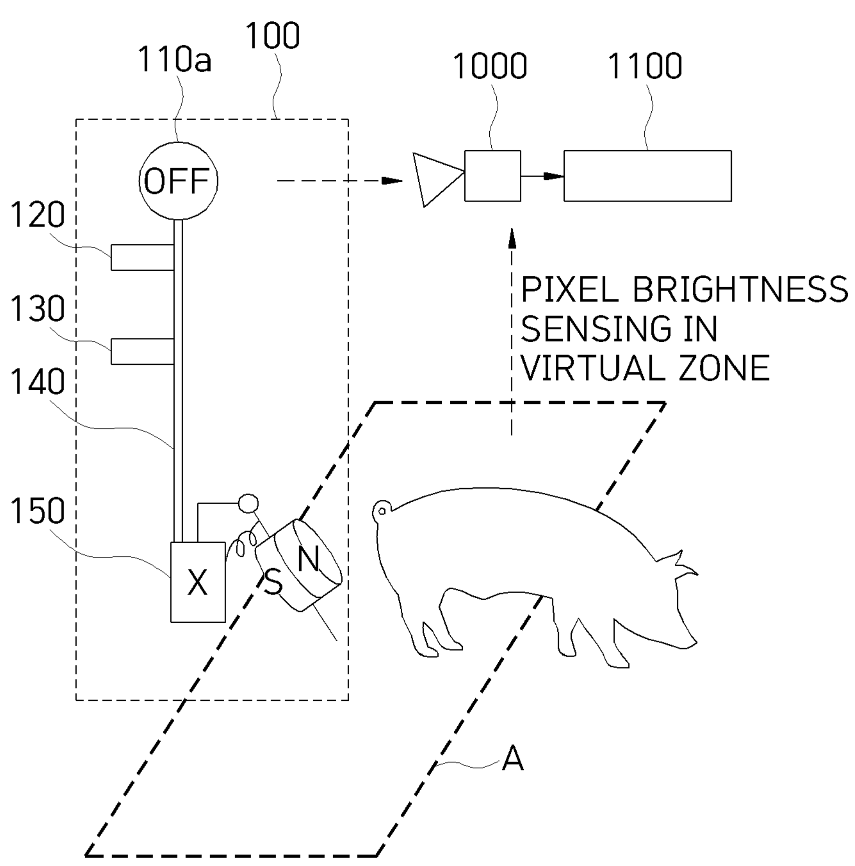
FIGS. 6A, 6B, 7A and 7B show the operation of a feed feeder contact notification lighting according to an embodiment of the present disclosure.
Figure 6B:
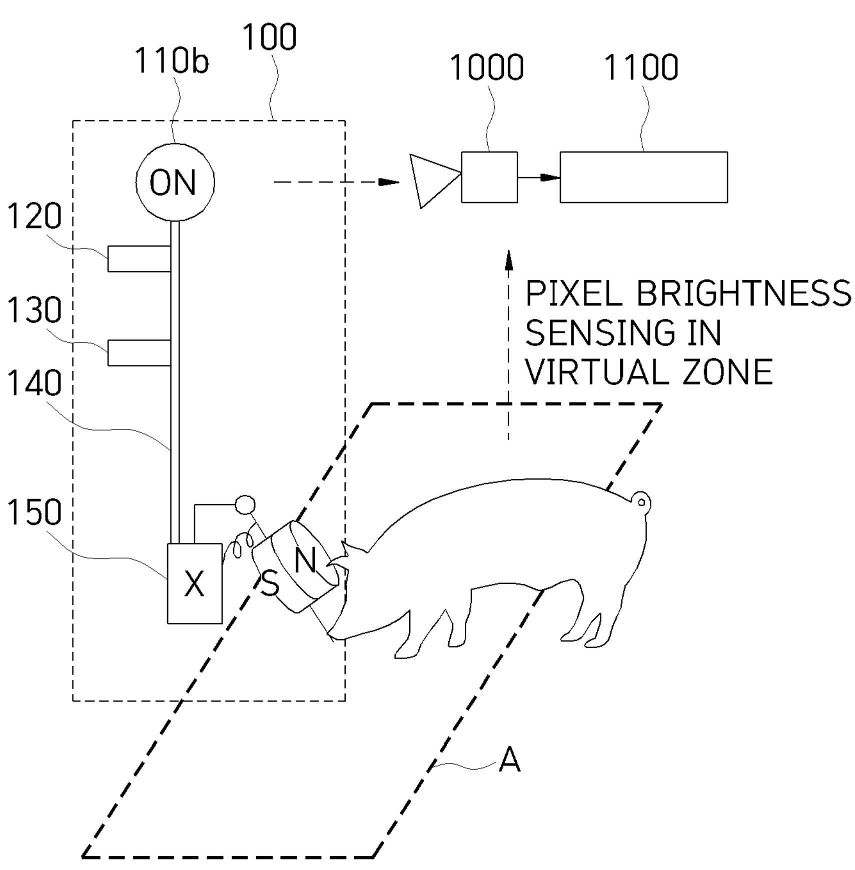

As shown in FIG. 6A, when the pig moves away from the feed container, that is, when there is no contact, the notification lighting is turned off (110*a*), and as shown in FIG. 6B, when the pig approaches and contacts the feed container, the notification lighting is turned on (110*b*).

The image obtained through the image camera 1000 is provided to an image analysis part 1100, and the image analysis part 1100 sets the virtual feed intake action zone A, and senses the pixel brightness of pigs in the virtual zone in the pigpen, which is a dark and closed environment.

Figure 7A:
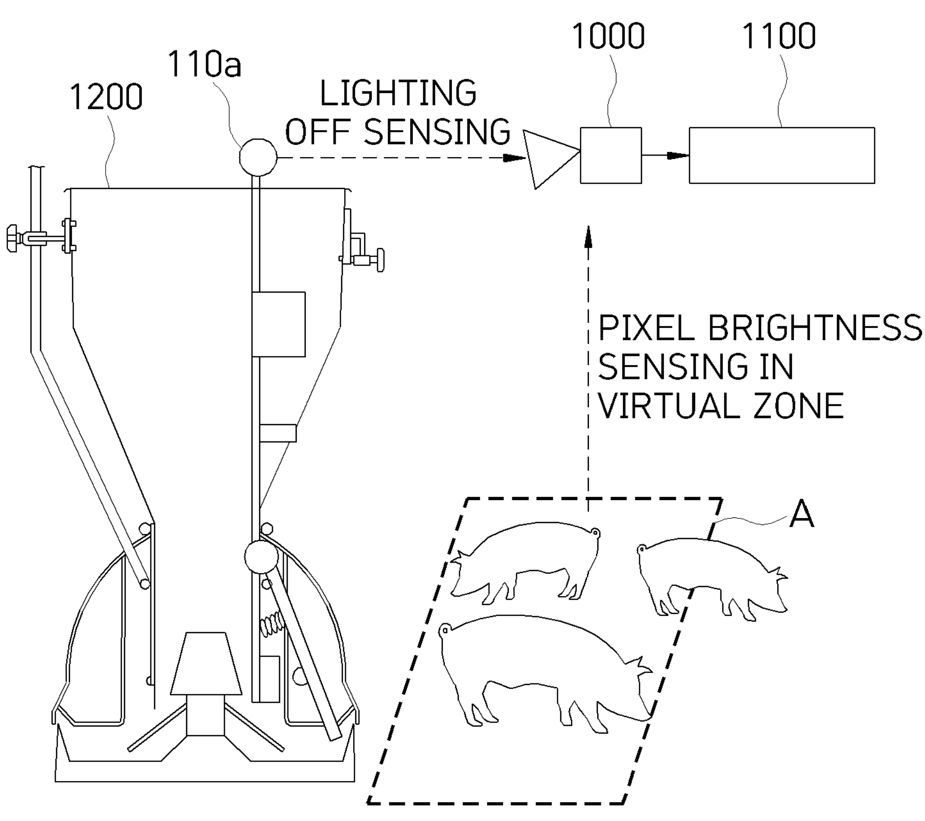
Figure 7B:
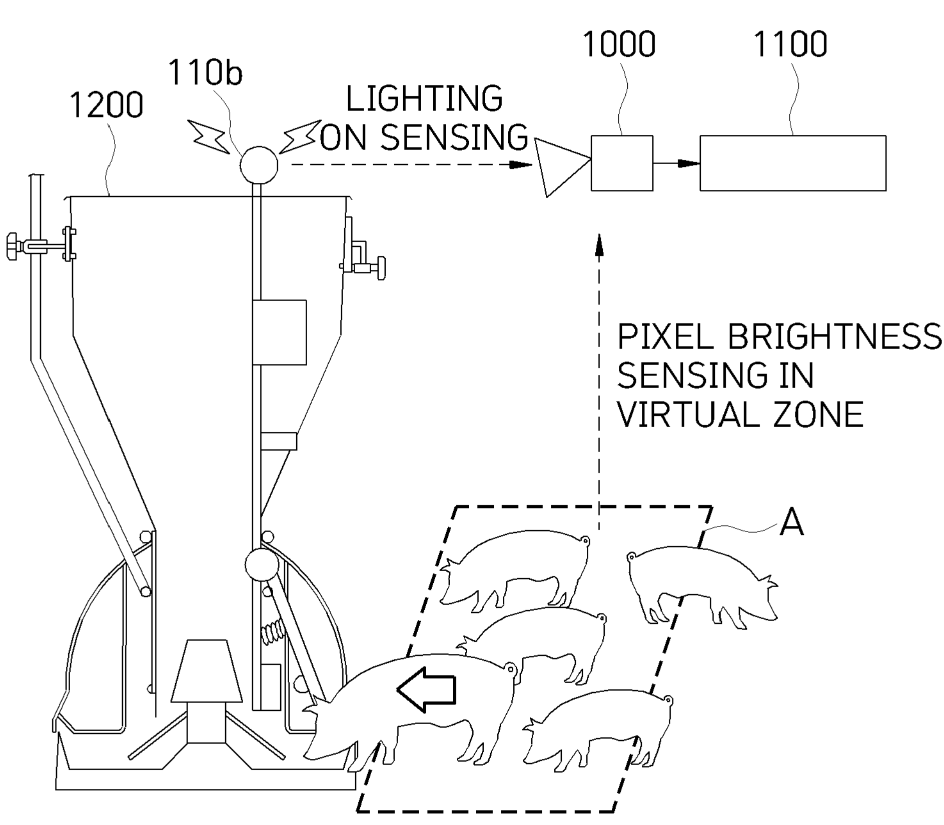
Figure 8:
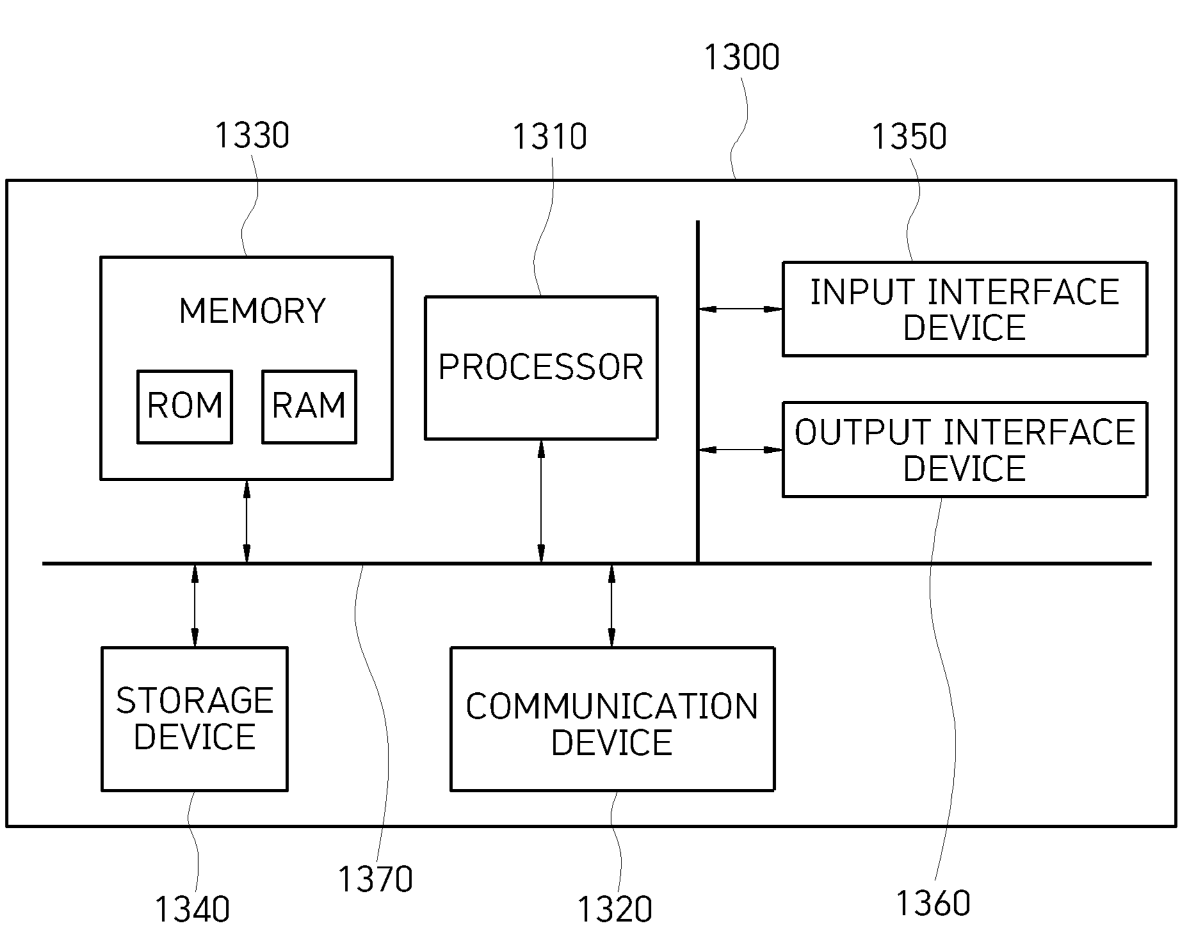
FIG. 8 is a block diagram illustrating a computer system for implementing the method according to the embodiment of the present invention.

FIGS. 7A to 7C show that a lighting device 100 according to an embodiment of the present disclosure is mounted on a feed feeder 1200.

The image obtained through the image camera 1000 is provided to the image analysis part 1100, and the contact is sensed through the notification lighting to determine the feed intake intention of the pigs existing in the virtual feed intake action zone A, and provide feed by controlling the feed feeder 1200.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. An apparatus for controlling a feed supply amount based on feed intake intention of livestock, the apparatus comprising:

a processor; and a memory having instructions stored thereon which, when executed by the processor, cause the processor to execute:

a feed intake intention quantification part which perceives a feed intake intention of livestock by analyzing pixel brightness information of image information obtained by photographing a preset virtual feed intake action zone within a livestock farm and quantifies the feed intake intention of livestock as a feed intake intention value, wherein the virtual feed intake action zone indicates a region adjacent to a feed container within the livestock farm; and a feed intake intention-based feed supply amount control part generating a command for controlling a feed supply amount in consideration of the feed intake intention value.

2. The apparatus for controlling a feed supply amount based on feed intake intention of livestock according to claim 1, wherein the feed intake intention quantification part includes:

a timestamp generating part configured to receive feed container contact event occurrence information and output a timestamp value for an event occurrence time;

a pixel brightness amount sensing part configured to analyze the pixel brightness information within the virtual feed intake action zone and output pixel brightness amount information;

a dictionary generating part configured to configure dictionary data using the timestamp value and the pixel brightness amount information;

a pixel brightness value averaging part configured to output a pixel brightness average value using the dictionary data; and a feed intake intention quantification module configured to output a feed intake intention quantification value using the pixel brightness average value.

3. The apparatus for controlling a feed supply amount based on feed intake intention of livestock according to claim 2, wherein the timestamp generating part receives the feed container contact event occurrence information generated according to the result of perceiving the brightness of a lighting that is turned on or off depending on whether the livestock approaching the virtual feed intake action zone is in contact with the feed container.

4. The apparatus for controlling a feed supply amount based on feed intake intention of livestock according to claim 2, wherein the pixel brightness amount sensing part selects pixels having brightness higher than a predetermined pixel brightness threshold, and outputs a pixel brightness amount within the virtual feed intake action zone.

5. The apparatus for controlling a feed supply amount based on feed intake intention of livestock according to claim 4, wherein the pixel brightness amount sensing part converts the image information into a gray scale, and calculates a number of pixels having a brightness higher than the predetermined pixel brightness threshold relative to a total number of pixels in the virtual feed intake action zone, and outputs the pixel brightness amount.

6. The apparatus for controlling a feed supply amount based on feed intake intention of livestock according to claim 2, wherein the dictionary generating part configures the dictionary data according to time order by inputting the timestamp value to Key and inputting the pixel brightness amount information to Value.

7. The apparatus for controlling a feed supply amount based on feed intake intention of livestock according to claim 2, wherein the pixel brightness value averaging part outputs the pixel brightness average value at a predefined time interval.

8. The apparatus for controlling a feed supply amount based on feed intake intention of livestock according to claim 2, wherein the feed intake intention quantification module outputs the feed intake intention quantification value by using a predefined quantification weight.

9. The apparatus for controlling a feed supply amount based on feed intake intention of livestock according to claim 1, wherein when it is determined that the feed intake intention is high in consideration of the feed intake intention, the feed intake intention-based feed supply amount control part provides feed at a predefined number of times and updates a number of times of provision for a daily appropriate supply feed amount.

10. The apparatus for controlling a feed supply amount based on feed intake intention of livestock according to claim 1, wherein when it is determined that the feed intake intention is appropriate in consideration of the feed intake intention, the feed intake intention-based feed supply amount control part provides feed at a predefined one time and updates a number of times of provision for a daily appropriate supply feed amount.

11. The apparatus for controlling a feed supply amount based on feed intake intention of livestock according to claim 1, wherein when it is determined that the feed intake intention is low in consideration of the feed intake intention, the feed intake intention-based feed supply amount control part interrupts feed supply and maintains a number of times of provision for a daily appropriate supply feed amount, and transmits an abnormal notification to a farm manager.

12. A method for controlling a feed supply amount based on feed intake intention of livestock performed by an apparatus for controlling a feed supply amount based on feed intake intention of livestock, the method comprising:

(a) obtaining information about whether livestock is in contact with a feed container;

(b) determining the feed intake intention of the livestock by analyzing pixel brightness information of an image obtained by photographing a preset virtual feed intake action zone adjacent to the feed container, and calculating a feed intake intention value based on the pixel brightness information; and (c) controlling a feed supply amount based on the information obtained in step (a) and the feed intake intention value obtained in step (b).

13. The method for controlling a feed supply amount based on feed intake intention of livestock according to claim 12, wherein the step (a) includes receiving feed container contact event occurrence information generated according to a result of perceiving brightness of a lighting that is turned on or off depending on whether the livestock approaching the virtual feed intake action zone is in contact with the feed container.

14. The method for controlling a feed supply amount based on feed intake intention of livestock according to claim 13, wherein the step (a) includes recording a timestamp value for an occurrence time of the feed container contact event occurrence information.

15. The method for controlling a feed supply amount based on feed intake intention of livestock according to claim 13, wherein the step (b) includes analyzing pixel brightness information within the virtual feed intake action zone to output pixel brightness amount information by selecting pixels having a brightness higher than a predefined pixel brightness threshold.

16. The method for controlling a feed supply amount based on feed intake intention of livestock according to claim 12, wherein the step (c) includes performing at least one of determining whether to supply feed, determining to supply feed at a predetermined number of times, and determining to update a number of times of provision for a daily appropriate supply feed amount, in consideration of the feed intake intention.

17. An apparatus for controlling a feed supply amount based on feed intake intention of livestock, the apparatus comprising:

an input part configured to obtain image photographing information for a preset virtual feed intake action zone near a feed container;

a memory configured to store a program for determining a feed intake intention by analyzing pixel brightness information of the image photographing information associated with the virtual feed intake action zone; and a processor configured to execute the program, wherein the processor calculates a feed intake intention value based on the pixel brightness information associated with the virtual feed intake action zone, and performs at least one of determining whether to supply feed, determining to supply feed at a predetermined number of times, and determining to update a number of times of provision for a daily appropriate supply feed amount, based on the feed intake intention value.

18. The apparatus for controlling a feed supply amount based on feed intake intention of livestock according to claim 17, wherein the processor generates dictionary data by using a timestamp value for a feed container contact event occurrence time and pixel brightness amount information obtained by analyzing the pixel brightness information for the virtual feed intake action zone, outputs a pixel brightness average value using the dictionary data, and calculates a quantified feed intake intention value in consideration of the pixel brightness average value.

19. The apparatus for controlling a feed supply amount based on feed intake intention of livestock according to claim 18, wherein the processor generates the pixel brightness amount information by using a number of pixels brighter than a predefined threshold relative to a total number of pixels within the virtual feed intake action zone, and outputs the pixel brightness average value using predefined time interval information.

* * * * *